United States Patent

Patmore et al.

[11] Patent Number: 6,039,105
[45] Date of Patent: *Mar. 21, 2000

[54] COMPRESSIBLE POCKET FOR CARGO SHADE ATTACHMENT

[75] Inventors: Kevin M. Patmore, Northville; Jeffrey A. Price, Lakeville; Michael C. Trombley, Sterling Heights, all of Mich.

[73] Assignee: Irvin Automotive Products, Inc., Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,687

[22] Filed: Jul. 11, 1997

[51] Int. Cl.$^7$ ...................................................... A47H 1/00
[52] U.S. Cl. ........................ 160/24; 160/23.1; 160/121.1; 160/26.3; 296/37.16; 403/329
[58] Field of Search .................. 160/23.1, 24, 121.1, 160/263, 120, 270; 296/37.16, 37.14, 37.8; 403/321, 325, 327, 329, DIG. 4, 109.1, 109.2, 109.5; 248/222.12, 230.7, 268

[56] References Cited

U.S. PATENT DOCUMENTS

| 918,579 | 4/1909 | Murch | 403/109.2 X |
|---|---|---|---|
| 4,168,094 | 9/1979 | Yagi . | |
| 4,404,714 | 9/1983 | Duran | 403/325 X |
| 4,502,674 | 3/1985 | White et al. | 160/23.1 X |
| 4,561,798 | 12/1985 | Elcrin et al. | 403/109.1 |
| 4,636,135 | 1/1987 | Bancon | 403/325 X |
| 5,031,266 | 7/1991 | Tillman et al. | 403/329 X |
| 5,172,540 | 12/1992 | Wenli et al. | 403/329 X |
| 5,186,517 | 2/1993 | Gilmore et al. | 248/221.12 X |
| 5,385,323 | 1/1995 | Garelick | 403/109.5 X |
| 5,484,223 | 1/1996 | Saito | 403/329 |
| 5,522,669 | 6/1996 | Recker | 403/325 X |
| 5,538,306 | 7/1996 | Ament | 296/37.1 |
| 5,577,859 | 11/1996 | Nau | 403/325 |
| 5,618,077 | 4/1997 | Ament et al. . | |
| 5,676,415 | 10/1997 | Ament et al. | 296/37.16 |
| 5,711,568 | 1/1998 | Diem et al. | 160/24 X |
| 5,716,161 | 2/1998 | Moore et al. | 403/329 X |
| 5,727,836 | 3/1998 | Hosoya | 296/37.1 |
| 5,813,449 | 9/1998 | Patmore et al. | 160/24 X |
| 5,829,910 | 11/1998 | Kameyama | 403/329 |

FOREIGN PATENT DOCUMENTS

| 0668187 | 8/1995 | European Pat. Off. . |
|---|---|---|
| 0692408 | 1/1996 | European Pat. Off. . |
| 0712757 | 5/1996 | European Pat. Off. . |
| 3922450 | 5/1991 | Germany . |
| 4135663 | 11/1992 | Germany . |
| 4405281 | 9/1995 | Germany . |
| 4414397 | 11/1995 | Germany . |
| 4441260 | 5/1996 | Germany . |
| 4-334635 | 11/1992 | Japan . |
| 2144848 | 12/1997 | Japan . |

*Primary Examiner*—David M. Purol
*Assistant Examiner*—Bruce A. Lev
*Attorney, Agent, or Firm*—Dinnin & Dunn

[57] ABSTRACT

A cargo shade attachment for retaining a cargo shade having a non-compressible roller tube with end caps thereon. The cargo shade attachment includes a pocket connected to an interior panel in a cargo area of a vehicle, a slidable plunger having a surface for engaging the end cap being mounted within the pocket, and a biasing device for urging the plunger toward a center line of the vehicle such that the plunger exerts a compressive force on the end cap of the cargo shade thereby retaining the cargo shade.

10 Claims, 2 Drawing Sheets

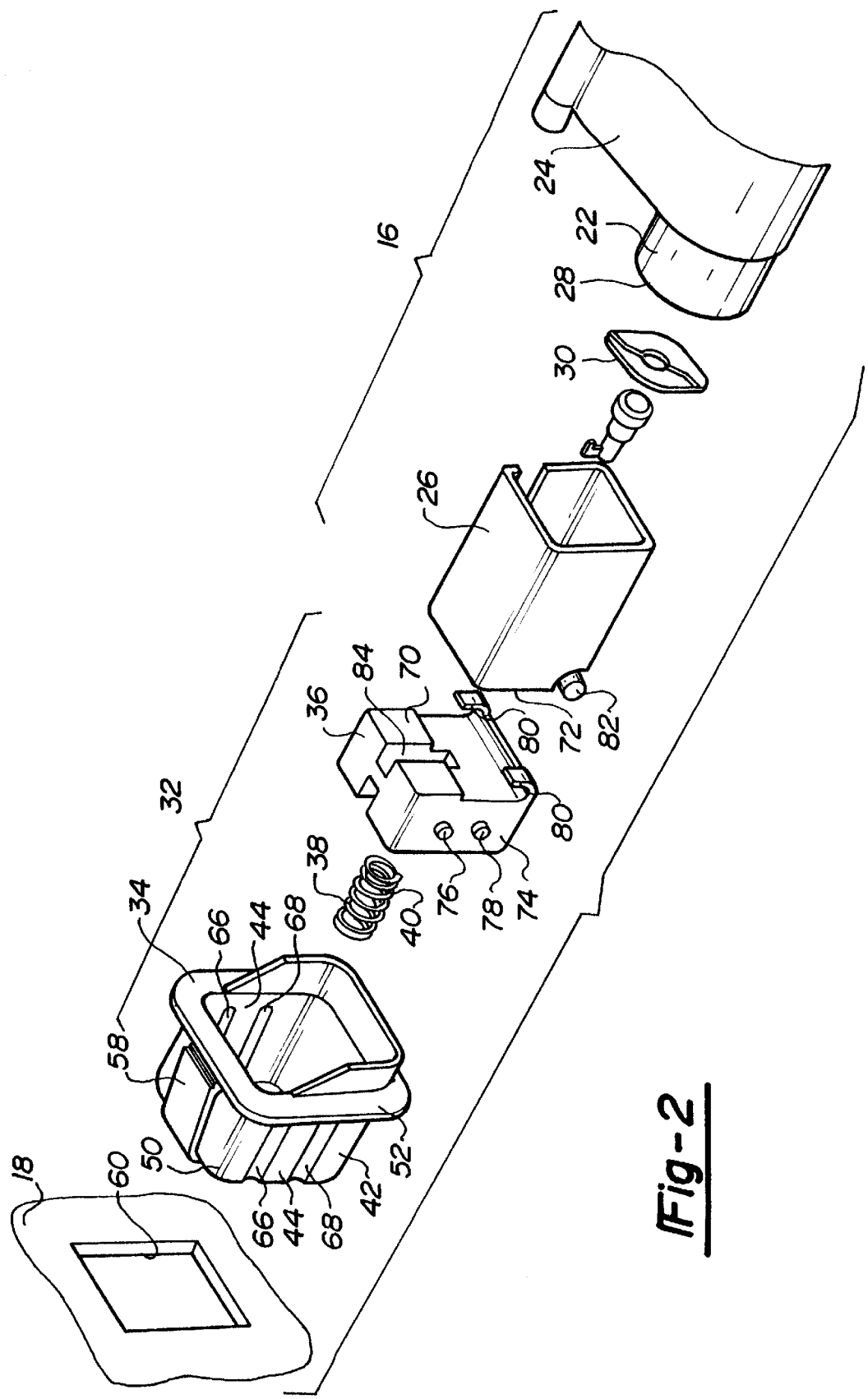

6,039,105

COMPRESSIBLE POCKET FOR CARGO SHADE ATTACHMENT

BACKGROUND OF THE INVENTION

1. Technical Field

This invention generally relates to a roller shade and, more particularly, to a compressible pocket for a cargo shade attachment adapted for use in a motor vehicle in conjunction with a cargo shade used to obstruct the view into an interior compartment area of the vehicle.

2. Discussion

In many types of motor vehicles, particularly hatchbacks, sport utility vehicles, and minivans, a rear compartment or cargo area is provided for storing cargo or personal items. Previously, articles in the cargo area could be easily viewed from the exterior of the vehicle. To discourage possible theft of these items from the vehicle, motor vehicle manufacturers often provide a retractable cargo shade or panel that can be extended to cover the cargo area and prevent people outside of the vehicle from readily viewing any stored articles.

Typically, cargo shades include a roller tube and a flexible fabric panel, which is wrapped onto the roller tube, and is mounted to a support structure in the vehicle. The roller tube is rotationally biased so that the shade can be extended to cover the compartment area and retracted onto the roller tube for storage when not in use. The free edge of the shade normally includes a pull tube or stiffener having a handle that enables the shade to be conveniently extended. The pull tube also includes clips or tabs, typically near its outer edges or rear edge, which engage brackets mounted to the vehicle side walls or rear panel in the cargo area and maintain the shade in its extended position.

Cargo shades are typically mounted so that the roller tube is positioned across one end of the cargo area with the shade being extendible rearward toward the vehicles rear cargo door. The shade is often positioned behind a rear seat back which can be folded down to enlarge the cargo area of the vehicle. With the seat back folded down the cargo shade needs to be removable to prevent it from obstructing and limiting full use of the enlarged cargo area. For this reason, cargo shades preferably offer a mounting system which allows them to be easily removed from and reinstalled in the vehicle. The complexity of conventional cargo shades is derived from the high number of components which must be incorporated into the ends of the security shade to provide for, not only the removable mounting of the security shade system, but also the rotational biasing of the roller tube. Presently, the end caps of the roller shade typically include both a spring bias device for retaining the shade between trim panels of the cargo area, and rotational biasing components to assist in rolling and unrolling the shade. This requires a great number of parts interacting in a relatively small area of the end caps.

In production these numerous components must be individually assembled which is both cumbersome and labor intensive. Efficiencies can be realized by separating the components which function to retain the cargo shade from those that assist in rolling and unrolling the shade. One method of separating the retention and rotational bias features is for the roller shade to have tabs on each end cap which engage some form of clip lock mounted on the trim panels of the cargo area. This type of system requires awkward two handed manipulation by the operator to actuate release levers and lift the shade during removal.

SUMMARY OF THE INVENTION

In accordance with the teachings of the present invention, there is disclosed a compressible pocket for attachment of a cargo shade. The pocket assembly is attached to the trim panel adjacent to the end of the roller tube of the cargo shade. The pocket assembly contains a compressible plunger which slidingly engages an end cap of the cargo shade. The plunger is biased toward the longitudinal center line of the vehicle such that the cargo shade is removably held in position between the trim panels of the cargo area by compression from the plunger.

BRIEF DESCRIPTION OF THE DRAWINGS

The various advantages of the present invention will become apparent to one skilled in the art upon reading the following specification and by reference to the drawings which include:

FIG. 2 is an exploded perspective view of a preferred embodiment of the cargo shade attachment shown in FIG. 1;

DETAILED DESCRIPTION OF THE PREFERRED EMBODIMENT

The following description of the preferred embodiment is merely exemplary in nature and is in no way intended to limit the invention or its application or uses.

Figure 1:
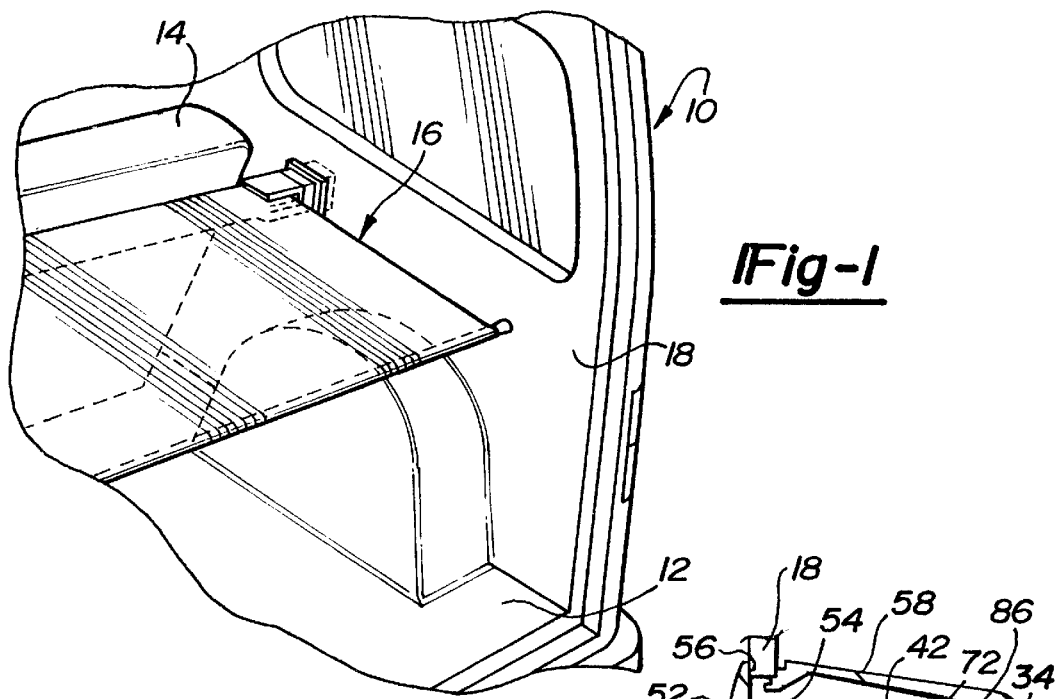
FIG. 1 is a partial perspective view of a vehicle cargo area incorporating a cargo shade attachment made in accordance with the teachings of the present invention.

Referring to FIG. 1, there is shown a vehicle 10 having a cargo area generally indicated at 12. Cargo area 12 is generally defined as extending from behind rear seat 14 to the rear interior surface (not shown) of vehicle 10. Cargo shade 16 is shown extending laterally across the vehicle 10 from one inner panel 18 to an opposite inner panel (not shown) within cargo area 12.

Referring to FIG. 2, cargo shade 16 is shown to include a generally non-compressible roller tube 22, a shade panel 24 wound about roller tube 22, and an end cap 26 located on a first end 28 of roller tube 22. A rotational biasing mechanism 30 is shown positioned within end cap 26 and acting on first end 28 of roller tube 22. A wide variety of rotational biasing mechanisms are presently known in the art which would function with equal results as related to the present application. Rotational biasing mechanisms which could be used include motor springs, clock springs, torsional springs, or other similar devices.

Further shown in FIG. 2 is a pocket assembly 32 made in accordance with the teachings of the present invention. Pocket assembly 32 includes pocket 34, plunger 36, and biasing device 38. Biasing device 38 is shown as a helical compression spring 40 in the present embodiment. As will be recognized by one skilled in the art any form of biasing device presently known or later discovered can be utilized with equal results.

Figure 3:
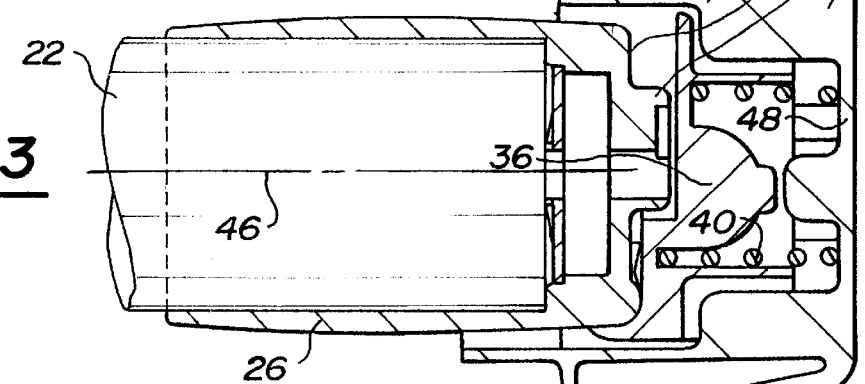
FIG. 3 is a vertical sectional view taken through the cargo shade attachment as shown in FIG. 1.

With additional reference to FIG. 3, pocket 34 is shown to include a housing portion 42 having housing side walls 44 generally extending parallel to an axis 46 of roller tube 22. An end wall 48 connects housing side walls 44 at one end 50 while radially outward extending flange portion 52 extends generally perpendicular to the housing side walls 44 at an opposite end 54.

Flange portion 52 generally conforms to the local surface contours of inner panel 18 and provides a bearing surface 56 between pocket 34 and inner panel 18. The preferred embodiment of the present invention incorporates snap features 58 for retaining pocket assembly 32 to inner panel 18. It is recognized that other retention methods may be incorporated with equal results.

In order to retain pocket assembly 32 utilizing snap features 58, an aperture 60 is provided in inner panel 18. Aperture 60 is larger than the outer dimension of housing portion 42 and smaller than the outer dimension of flange portion 52. As pocket assembly 32 passes through aperture 60, snap features 58 pivotally deflect until the distal end 62 of snap features 58 are beyond an exterior surface 64 of inner panel 18 at which point snap features 58 return to their free, nondeflected state and trap inner panel 18 between their distal end 62 and bearing surface 56 of flange portion 52.

Pocket 34 of the preferred embodiment also includes pairs of guide slots 66 and 68 in housing side walls 44. Upper guide slots 66 do not extend as far inboard in the vehicle as lower guide slots 68 as will be explained later in greater detail.

Plunger 36 of the present embodiment includes a first surface 70 coordinated to mate with end surface 72 of end cap 26. Extending from first surface 70, and generally parallel to axis 46 of roller tube 22, are plunger side walls 74. The outer dimension of plunger side walls 74 is coordinated with the inner dimension of housing side walls 44 such that a sliding contact or slight clearance is provided therebetween. Extending from plunger side walls 74, and aligned with guide slots 66 and 68, are guide pins 76 and 78, respectively. Guide pins 76 and 78 slide within guide slots 66 and 68 to provide smooth operation as pocket assembly 32 is used. The coordination of guide slots 66 and 68 with guide pins 76 and 78 also allows for pivotal movement of plunger 36 during removal of cargo shade 16 as will be described in greater detail with reference to FIG. 4 below.

First surface 70 of plunger 36 provides for retention of cargo shade 16 by coordinating with features of end surface 72. Detents 80 at a lower portion of first surface 70 create a slight interference fit with pins 82 of end surface 72. The interference fit is designed to both retain cargo shade 16 to pocket assembly 32 and provide a positive tactile and/or audible feedback to the operator when installing cargo shade 16, thereby indicating that cargo shade 16 is firmly installed. An anti-rotation feature, represented in the present embodiment by anti-rotation slot 84 in first surface 70 and coordinated anti-rotation boss 86 in end surface 72 prevents end cap 26 from rotating when shade panel 24 is extended or retracted, thereby allowing rotational biasing mechanism 30 to assist the operator in rolling or unrolling shade panel 24.

Figure 4:
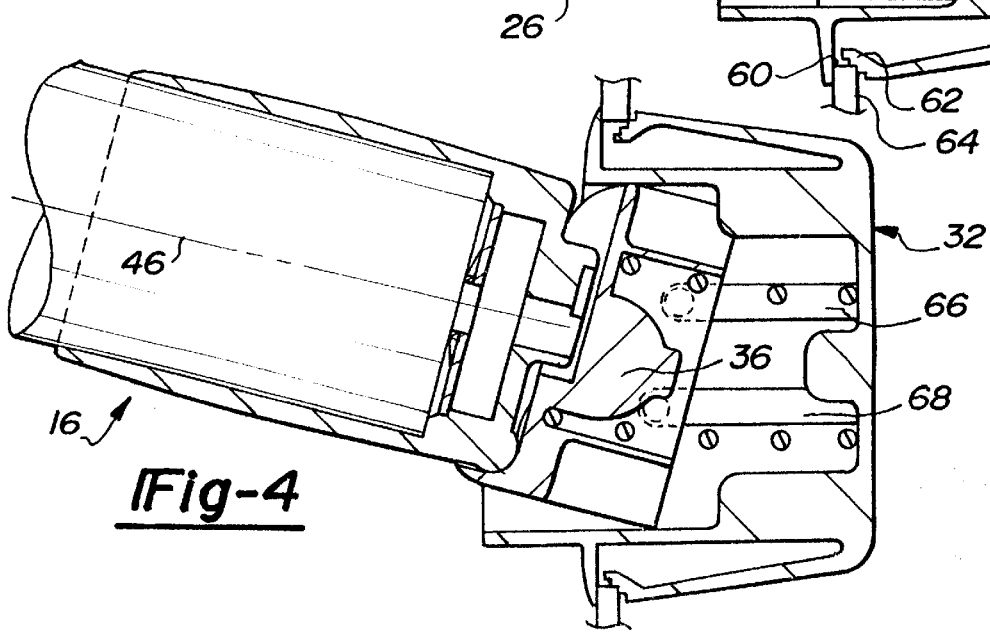
FIG. 4 is a cross-sectional view of the cargo shade attachment made in accordance with the teachings of the present invention during removal of the cargo shade.

Referring to FIGS. 3 and 4, the installation and removal of cargo shade 16 will be described. Cargo shade 16 is installed by aligning end surface 72 of end cap 26 with first surface 70 of plunger 36 and applying a slight load along axis 46 of roller tube 22 such that spring 40 is compressed. By compressing spring 40 plunger 36 is allowed to slide away from the longitudinal center line of the vehicle and provide clearance such that an opposite end cap 26' (symmetrically opposite end cap 26 and not shown) is allowed to swing clear of opposite inner panel 18' (generally symmetrical to and opposite panel 18) (not shown). A slight downward force is then applied to end cap 26 such that pins 82 engage detents 80. FIG. 3 is shown in the fully compressed condition, approximately 15 mm of compressible travel being provided in the preferred embodiment. Opposite end cap 26' (not shown) can then be fastened to a symmetrically opposite pocket assembly 32' (not shown) installed in opposite inner panel 18' (not shown) by applying a downward force to opposite end cap 26' (not shown). Alternately, it will be recognized by those skilled in the art that opposite end cap 26' (not shown) could be installed in a fixed, non-compressible pocket thereby allowing spring 40 to be the sole provider of compressive forces retaining cargo shade 16.

Assuming that the preferred embodiment utilizes two symmetrically opposite pocket assemblies 32 and 32' (not shown), spring 40 and opposite spring 40' (not shown), having generally equivalent spring rates, would act to laterally center cargo shade 16 within cargo area 12. In this condition approximately 5 mm of the 15 mm of travel is preferably utilized as the compressive forces which retain cargo shade 16. The remaining 10 mm of compressive travel allow for not only the installation of cargo shade 16 but also provide for accommodating cross-car build variations which may result during the assembly of the many components utilized to build the vehicle 10. The self-centering feature of the present invention allows for uniform spacing between each edge of shade panel 24 and an interior surface of inner panels 18 and 18'.

Removal of cargo shade 16 is accomplished by applying a load along axis 46 thereby compressing spring 40 and allowing opposite end cap 26' (not shown) to be clear of the inner surface of opposite inner panel 18' (not shown). An upward vertical load is applied to opposite end cap 26' (not shown) thereby disengaging pins 82' (not shown) from detents 80' (not shown). Opposite end cap 26' (not shown) is then rotated upwardly and spring 40 is allowed to bias plunger 36 toward the longitudinal center line of the vehicle as shown in FIG. 4.

As shown in FIG. 4, by having lower guide slots 68 longer than upper guide slots 66 plunger 36 is allowed to pivot as the opposite end of cargo shade 16 is lifted. Once in the position shown in FIG. 4, a light upward vertical force can be applied to end cap 26 thereby disengaging pins 82 from detents 80 (shown in FIG. 2) and freeing cargo shade 16 from pocket assembly 32. Once cargo shade 16 is detached from plunger 36 the spring force of spring 40 acts to return plunger 36 to its previous nonpivoted position.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A cargo shade attachment for retaining a cargo shade in a cargo area of a vehicle, said shade having a non-compressible roller tube with end caps thereon, said attachment comprising:

a pocket adapted to be connected to an interior panel in said cargo area, said pocket including a housing portion having housing side walls extending generally parallel to an axis of said roller tube and having an end wall connecting said side walls at one end and a flange portion extending generally perpendicular from said housing side walls at an opposite end, said flange portion being adapted to substantially conform to and contact the interior panel in said cargo area such that said housing side walls are adapted to be received in an aperture in the interior panel in the cargo area, said pocket having opposing pairs of guide slots;

a plunger slidably mounted within said pocket, said plunger having a first surface adapted to engage one of the end caps on the roller tube, said plunger having pairs of guide pins each in engagement with said guide slots, one of said pairs of guide slots being longer than the other in order to allow pivotal movement of said plunger; and a biasing device for urging said plunger toward a centerline of said vehicle such that said plunger is adapted to exert a compressive force on said end cap thereby retaining said cargo shade.

2. The cargo shade attachment of claim 1 wherein said pocket includes snap features which are adapted to engage an exterior surface of said interior panel thereby retaining said pocket by a force created between said snap feature acting on said exterior surface and said flange portion acting on an interior surface of said interior panel.

3. The cargo shade attachment of claim 1 wherein said plunger further includes plunger side walls extending generally perpendicular to said first surface, said plunger side walls providing a slidable interface within said pocket side walls.

4. The cargo shade attachment of claim 3 wherein said first surface of said plunger provides an anti-rotation feature adapted to coordinate with a mating anti-rotation feature on an end surface of said end cap, thereby preventing relative rotation between said plunger and said end cap such that a rotational biasing mechanism can be utilized to assist in rolling or unrolling a shade panel of said cargo shade.

5. A cargo shade system used to conceal items stored in a cargo area of a vehicle with an inner panel and an opposite inner panel, said system comprising:

a cargo shade having a substantially non-compressible roller tube with a first end cap on a first end and a second end cap on an opposite second end, said cargo shade having a shade panel wrapped about said roller tube which is adapted to be rolled or unrolled to cover said cargo area;

a pocket assembly adapted to be mounted on an inner panel of said cargo area, said pocket assembly having a pocket, a plunger, and a biasing device which are adapted to removably retain said cargo shade in said cargo area, said pocket including a housing portion having housing side walls extending generally parallel to an axis of said roller tube and having an end wall connecting said side walls at one end and a flange portion extending generally perpendicular from said housing side walls at an opposite end, said flange portion being adapted to substantially conform and contact the interior panel in said cargo area such that said housing side walls are adapted to be received in an aperture in the interior panel in the cargo area, said pocket having opposing pairs of guide slots, said plunger having pairs of guide pins each in engagement with said guide slots, one of said pairs of guide slots being longer than the other in order to allow pivotal movement of said plunger; and wherein said first end cap of said cargo shade aligns with and contacts said plunger of said pocket assembly, said biasing device urging said plunger toward said end cap such that a compressive force acts to retain said cargo shade relative to said inner panel.

6. The cargo shade system of claim 5 wherein a plunger of a second pocket assembly is aligned with and contacts said second end cap, said plunger of said second pocket assembly being biased toward said second end cap such that a compressive force acts upon said second end cap and an oppositely directed compressive force acts on said first end cap thereby retaining said cargo shade and generally locating said cargo shade in a central position between said inner panel and said opposite inner panel.

7. The cargo shade system of claim 5 wherein said pocket includes snap features which are adapted to engage an exterior surface of said interior panel thereby retaining said pocket by a force exerted between said snap feature acting on said exterior surface and said flange portion acting on an interior surface of said interior panel.

8. A cargo shade attachment for retaining a cargo shade in a cargo area of a vehicle, said shade having a non-compressible roller tube with end caps thereon, said attachment comprising:

a pocket adapted to be connected to an interior panel in said cargo area;

a plunger slidably mounted within said pocket, said plunger having a first surface adapted to engage one of the end caps on the roller tube, said plunger being nonrotatable relative to a longitudinal axis of said pocket, said pocket having opposing pairs of guide slots, said plunger having pairs of guide pins each in engagement with said guide slots, one of said pairs of guide slots being longer than the other in order to allow pivotal movement of said plunger about a transverse axis of said pocket; and a biasing device for urging said plunger toward a centerline of said vehicle such that said plunger is adapted to exert a compressive force on said end cap thereby retaining said cargo shade.

9. The cargo shade attachment of claim 8, wherein said plunger includes a pair of detents adapted to receive a corresponding pair of pins disposed on one of said end caps.

10. A cargo shade system used to conceal items stored in a cargo area of a vehicle with an inner panel and an opposite inner panel, said system comprising:

a cargo shade having a substantially non-compressible roller tube with a first end cap on a first end and a second end cap on an opposite second end, said cargo shade having a shade panel wrapper about said roller rube which is adapted to be rolled or unrolled to cover said cargo area;

a pocket assembly adapted to be mounted on an inner panel of said cargo area, said pocket assembly having a pocket, a plunger, and a biasing device which are adapted to removably retain said cargo shade in said cargo area, said plunger being nonrotatable relative to a longitudinal axis of said pocket, said pocket having opposing pairs of guide slots, said plunger having pairs of guide pins each in engagement with said guide slots, one of said pairs of guide slots being longer than the other in order to allow pivotal movement of said plunger about a transverse axis of said pocket; and wherein said first end cap of said cargo shade aligns with and contacts said plunger of said pocket assembly, said biasing device urging said plunger toward said end cap such that a compressive force acts to retain said cargo shade relative to said inner panel.

\* \* \* \* \*